(12) United States Patent
Tegeltija et al.

(10) Patent No.: US 11,549,580 B2
(45) Date of Patent: Jan. 10, 2023

(54) GEAR UNIT HAVING A FIRST AND A SECOND HOUSING PART

(71) Applicant: SEW-EURODRIVE GMBH & CO. KG, Bruchsal (DE)

(72) Inventors: Miki Tegeltija, Karlsdorf-Neuthardt (DE); Oliver Bühn, Kraichtal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 316 days.

(21) Appl. No.: 16/953,637

(22) Filed: Nov. 20, 2020

(65) Prior Publication Data

US 2021/0071748 A1 Mar. 11, 2021

Related U.S. Application Data

(63) Continuation of application No. 14/390,654, filed as application No. PCT/EP2013/000643 on Mar. 6, 2013, now Pat. No. 10,871,216.

(30) Foreign Application Priority Data

Apr. 4, 2012 (DE) .......................... 102012006790.9

(51) Int. Cl.
*F16H 57/02* (2012.01)
*F16H 57/021* (2012.01)
*F16H 57/023* (2012.01)
*F16H 57/038* (2012.01)

(52) U.S. Cl.
CPC ......... *F16H 57/021* (2013.01); *F16H 57/023* (2013.01); *F16H 57/038* (2013.01); *F16H 2057/02021* (2013.01); *Y10T 74/19642* (2015.01); *Y10T 74/19688* (2015.01); *Y10T 74/2186* (2015.01)

(58) Field of Classification Search
CPC .... F16H 57/021; F16H 57/023; F16H 57/038; F16H 2057/02021
See application file for complete search history.

(56) References Cited

U.S. PATENT DOCUMENTS

| 1,989,007 | A | 1/1935 | Gorton |
| 2,958,563 | A | 11/1960 | Alexandroff |
| 4,887,826 | A | 12/1989 | Kantner |
| 5,058,262 | A | 10/1991 | Brockmuller et al. |

(Continued)

FOREIGN PATENT DOCUMENTS

| CN | 101994766 A | 3/2011 |
| DE | 1977305 U | 1/1968 |

(Continued)

OTHER PUBLICATIONS

International Search Report, dated May 3, 2013, issued in corresponding International Application No. PCT/EP2013/000643.

(Continued)

*Primary Examiner* — Zakaria Elahmadi

(74) *Attorney, Agent, or Firm* — Carter, DeLuca & Farrell LLP

(57) ABSTRACT

A gear unit is described as having a first and a second housing part, an intermediate shaft of the gear unit being mounted via two bearings in a bushing accommodating the bearings, the bushing centering the first housing part against the second housing part.

20 Claims, 4 Drawing Sheets

(56) References Cited

U.S. PATENT DOCUMENTS

| | | | |
|---|---|---|---|
| 5,065,639 A | 11/1991 | Flanhardt et al. | |
| 5,501,117 A | 3/1996 | Mensing et al. | |
| 7,651,276 B2 | 1/2010 | Nied et al. | |
| 8,696,208 B1 | 4/2014 | Everline et al. | |
| 9,157,508 B2 | 10/2015 | Allgaier et al. | |
| 2003/0032521 A1* | 2/2003 | Boston | F16C 21/00 475/331 |
| 2003/0106384 A1* | 6/2003 | Yokota | F16C 19/386 74/424 |
| 2005/0185873 A1* | 8/2005 | Musso | F16H 48/08 384/571 |
| 2005/0238273 A1* | 10/2005 | Kawamura | F16H 57/037 384/504 |
| 2006/0089226 A1* | 4/2006 | Garcia | B60B 35/18 475/221 |
| 2006/0156842 A1* | 7/2006 | Melber | F16H 1/14 74/423 |
| 2006/0185462 A1* | 8/2006 | Berg | B62D 1/187 280/775 |
| 2006/0273784 A1* | 12/2006 | Godoy | G01D 5/145 324/207.2 |
| 2007/0151823 A1* | 7/2007 | Kwoka | B60K 23/0808 192/70.23 |
| 2010/0079020 A1* | 4/2010 | Tang | F16H 1/16 310/83 |
| 2010/0307270 A1* | 12/2010 | Brick | F16H 1/145 74/423 |
| 2011/0037269 A1 | 2/2011 | Poon et al. | |
| 2011/0076096 A1* | 3/2011 | Slayne | F16D 3/06 403/372 |
| 2012/0285802 A1* | 11/2012 | Scott | F16C 35/077 198/788 |
| 2013/0230266 A1* | 9/2013 | Earle | B60B 27/0005 384/537 |

FOREIGN PATENT DOCUMENTS

| | | |
|---|---|---|
| DE | 3707176 A1 | 11/1988 |
| DE | 10331348 A1 | 6/2004 |
| DE | 102007061540 A1 | 6/2009 |
| EP | 0280776 A1 | 9/1988 |
| EP | 2 574 824 A1 | 4/2013 |
| WO | 2005/111443 A1 | 11/2005 |

OTHER PUBLICATIONS

International Preliminary Report on Patentability, dated Oct. 23, 2014, issued in corresponding International Application No. PCT/EP2013/000643.

* cited by examiner

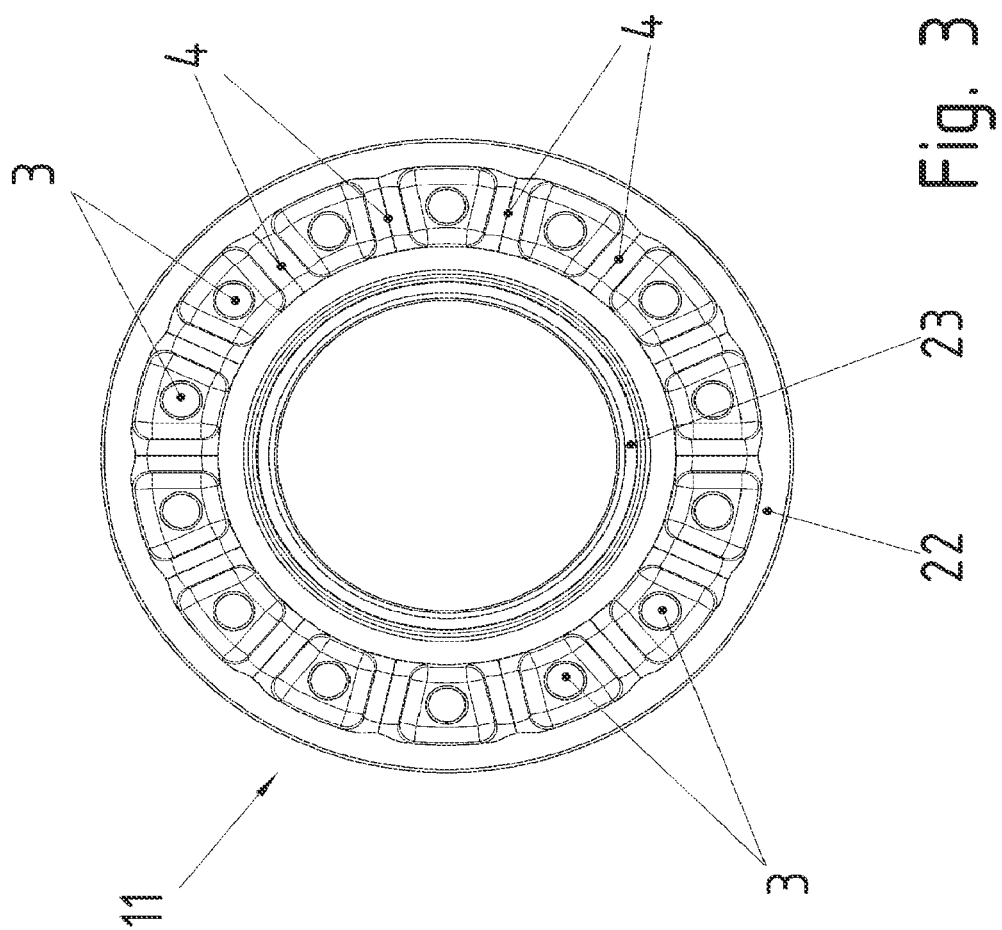

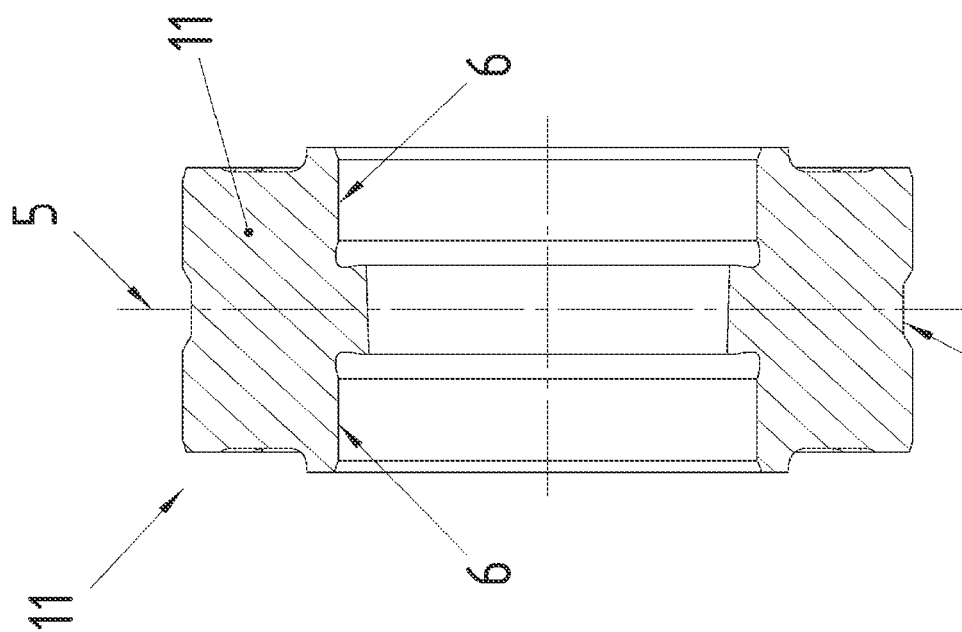

GEAR UNIT HAVING A FIRST AND A SECOND HOUSING PART

CROSS-REFERENCE TO RELATED APPLICATIONS

The present application is a continuation of U.S. patent application Ser. No. 14/390,654, which is the national stage of PCT/EP2013/000643, having an international filing date of Mar. 6, 2013, and claims priority to Application No. 102012006790.9, filed in the Federal Republic of Germany on Apr. 4, 2012, each of which is expressly incorporated herein in its entirety by reference thereto.

FIELD OF THE INVENTION

The present invention relates to a gear unit having a first and a second housing part.

BACKGROUND INFORMATION

It is generally known that intermediate shafts of gear units are mounted via bearings in the gear housing.

SUMMARY

Therefore, the object of the present invention is to further develop a gear unit, in doing which, the intention being for its manufacture to be simple.

The objective is achieved according to the present invention in the gear unit.

Important features of the present invention with regard to the gear unit having a first and a second housing part are that an intermediate shaft of the gear unit is mounted via two bearings in a bushing accommodating the bearings, the bushing centering the first housing part against the second housing part.

The advantage in this context is that the bearings together with the intermediate shaft are able to be mounted in the bushing, and the entire unit thus assembled is then able to be inserted and pressed into the first housing part. The second housing part is thereupon slipped onto the bushing projecting partially from the first housing part. In this manner, the two housing parts are able to be centered against each other, and at the same time, assembly is simplified. The housing parts may be produced easily as die casting.

The bushing may be produced as a die-cast part, especially when made of metal, or as an injection-molded part, especially when made of plastic.

Incorrect assembly is easily preventable owing to the symmetrical construction of the bushing. In this context, the plane of symmetry contains the center of mass of the bushing, and the axial direction of the intermediate shaft is the direction of surface normal with respect to the plane of symmetry.

In one advantageous development, the first and second housing parts are screw-connected to each other, the screw connection being located outside of the bushing. The advantage here is that a firm connection is able to be produced.

In one advantageous refinement, the bushing has an outer sleeve section which abuts against the accommodation areas of the two housing parts. This is advantageous because a structure able to support load is attained accompanied by low expenditure for materials, and in addition, openings are provided for the passage of oil.

In one advantageous development, the outer sleeve section has a first axial part in the form of an insertion-fit area, and has a second axial part in the form of an interference-fit area, the axial direction corresponding to the axis of the intermediate shaft. This offers the advantage that insertion into the housing parts is facilitated, and the interference-fit area is able to support load owing especially to thermal shrinking. In addition, adhesive agent is provided.

In one advantageous refinement, the bushing has an inner sleeve section which accommodates a first bearing of the intermediate shaft in a first axial part, and a second bearing of the intermediate shaft in a second axial part, a crosspiece segment being disposed axially between the first and second parts whose smallest radial distance is less than the smallest radial distance of the first or second part. The advantage is that a structure able to support load is obtained, having axial through-openings.

In one advantageous refinement, the inner and outer sleeve sections are joined via support ribs, the support ribs being set apart from each other, in particular, being evenly spaced from each other in the circumferential direction. The advantage in this case is that axial through-openings are able to be provided for the passage of oil, and thus for the lubrication of the gear teeth and bearings disposed on both sides of the bushing.

In one advantageous development, the bearings are tapered roller bearings, especially in O-configuration, X-configuration or tandem configuration. This is advantageous because it permits the use of easily producible bearing configurations.

In one advantageous embodiment, the intermediate shaft is joined in rotatably fixed manner to a first toothing part or has a corresponding toothing, so that a first axial bearing is bounded axially by the toothing part or the toothing section, on the axial side of the bushing opposite from this, a further toothing part being joined in rotatably fixed manner to the intermediate shaft and bounding the other bearing axially, in particular, the further toothing part being bounded axially by a retaining ring. The advantage in this context is that preloading of the bearings is easily attainable.

In one advantageous development, the intermediate shaft is provided with or joined in rotatably fixed manner to a bevel-pinion toothing and/or the intermediate shaft is provided with or joined to a helical cylindrical-gear toothing. This offers the advantage that the intermediate shaft is able to be manufactured in an easy manner.

In one advantageous embodiment, the bevel-pinion toothing is in mesh with a bevel-gear wheel mounted in the second housing part via bearings accommodated there. The advantage in this case is that the bushing advantageously permits a simple construction of a bevel gear.

In one advantageous development, the first housing part is joined to a motor housing, a rotor shaft being mounted via bearings accommodated in the motor housing, the rotor shaft being joined in rotatably fixed fashion to an input toothing part of the gear unit, the input toothing part being surrounded radially by the first housing part. The advantage in this case is that the input toothing part is disposed in the gear unit and is supported via the motor.

In one advantageous embodiment, the toothing part joined in rotatably fixed manner to the intermediate shaft engages with the input toothing part joined to the rotor shaft. This offers the advantage that the input toothing part is able to be supported via the electric motor.

In one advantageous development, the bushing is pressed into an accommodation area of the first housing part and into an accommodation area—situated coaxially relative to it—of the second housing part. This is advantageous because centering is able to be realized with the aid of the bushing.

In one advantageous refinement, the first and second housing parts are imperviously joined. The advantage in so doing is that oil is able to be used in the interior of the gear unit.

In one advantageous embodiment, an annular spatial area for receiving adhesive is located between one of the housing parts and the bushing, in particular, the spatial area being delimited by a depression in the bushing and by the accommodation area of the housing part for the bushing. The advantage in this case is that the bushing is able to be protected against twisting relative to the housing with the aid of the adhesive connection, although upon assembly, the bushing is able to rotate prior to the hardening of the adhesive, and thus setting of the bearings is able to be promoted.

Further advantages are derived from the dependent claims. The present invention is not limited to the feature combination of the claims. Further useful combination possibilities of claims and/or individual claim features and/or features of the specification and/or of the figures are apparent for one skilled in the art, particularly from the problem definition and/or the objective set by comparison with the related art.

BRIEF DESCRIPTION OF THE DRAWINGS

FIG. 3 shows bushing 11 in plan view.

FIG. 4 shows bushing 11 in sectional view.

DETAILED DESCRIPTION

Figure 1:
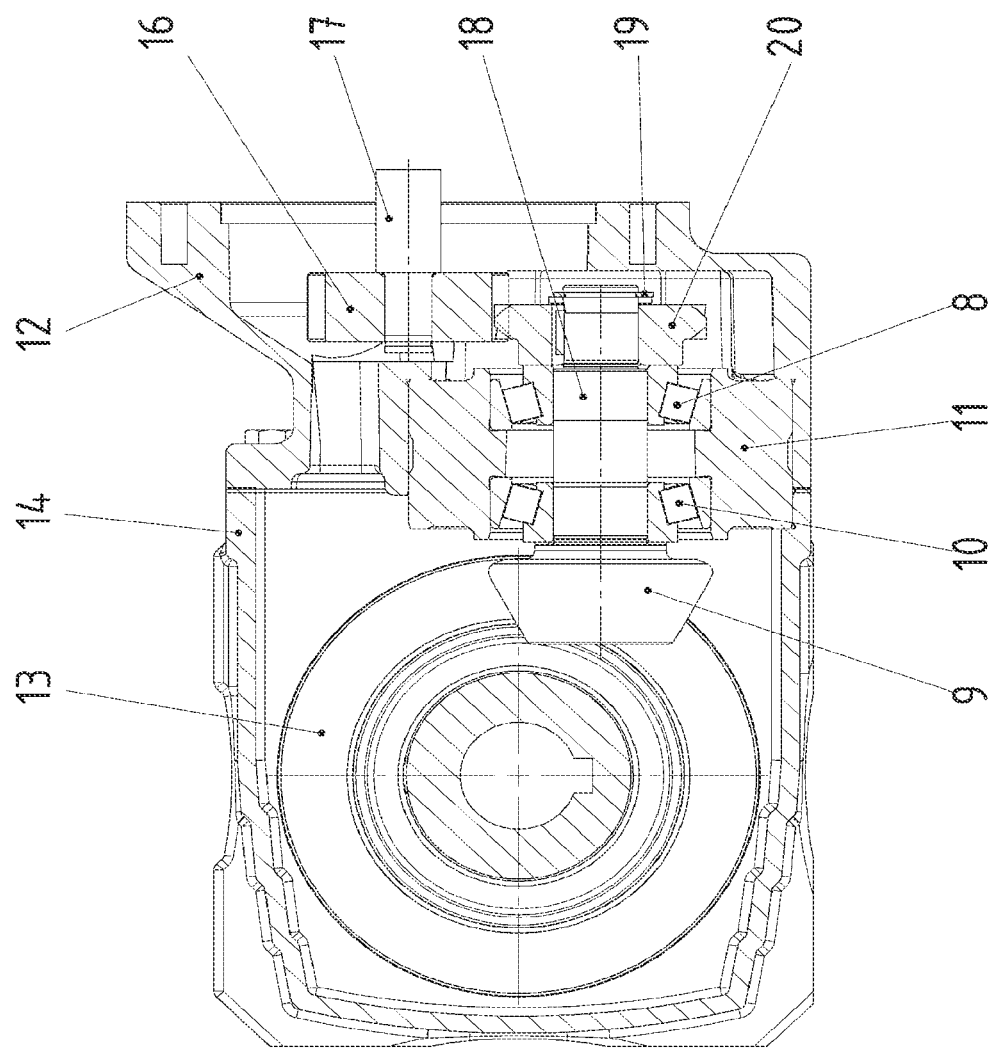
FIG. 1 shows a sectional view through a gear unit according to the present invention having a bushing 11.
Figure 2:
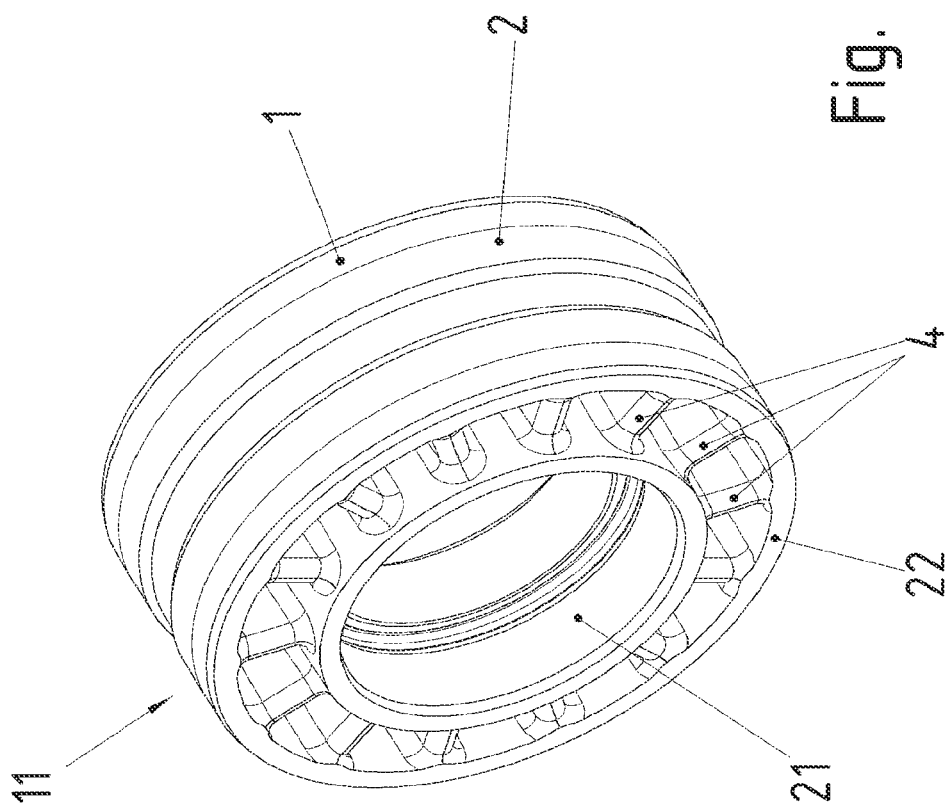
FIG. 2 shows bushing 11 in an oblique view.

The housing of the gear unit has at least two housing parts 12, 14, which are centered relative to each other by bushing 11.

Bushing 11 accommodates two bearings 8, 10, via which an intermediate shaft 18 is mounted that, at its axial end area on the input side, is joined in rotatably fixed manner to a gear wheel 20, which is in mesh with an input gear wheel 16 that is joined in rotatably fixed manner to an input shaft 17, especially a rotor of a driving electric motor, not shown. Gear wheel 16, together with shaft 17, is supported in the housing of the driving device, especially electric motor. The housing of the driving device is joined to first housing part 12, a centering means, especially a centering collar, being formed here on first housing part 12.

At its other axial end area, intermediate shaft 18 is joined in rotatably fixed manner to bevel pinion 9. Alternatively, intermediate shaft 18 is realized in one piece with bevel pinion 9, so that the gear teeth of the bevel pinion are Incorporated in a section of intermediate shaft 18.

Bevel pinion 9 is in mesh with bevel-gear wheel 13, which is supported via bearings in second housing part 14 or in a housing part joined to second housing part 14.

The inner ring of first bearing 10 of bushing 11 abuts against a shaft offset, especially against a collar, of intermediate shaft 18.

The outer ring of first bearing 10 abuts against an inner step of the inner wall of bushing 11.

The outer ring of second bearing 8 likewise abuts against an inner step of the inner wall of bushing 11. In this context, the two inner steps indicated are formed by a radially inwards extending, ring-shaped segment located on the inner wall of bushing 11, the segment being set apart radially from intermediate shaft 18.

The inner ring of second bearing 8 abuts against gear wheel 20, which cooperates with a retaining ring 19 disposed on the side of gear wheel 20 facing away from bearing 8.

Thus, by way of example, bearings 8, 10 may be implemented as tapered roller bearings and are retained so as to be bounded axially.

In the case of a two-piece construction of bevel pinion 9 and intermediate shaft 18, an axial limiting means is disposed between bevel pinion 9 and intermediate shaft 18.

Bushing 11 has a depression 7 on its outer side, and is accommodated in the cylindrical, preferably non-graduated accommodation areas of housing parts 12, 14. Preferably, the accommodation areas are produced as a bore hole.

Consequently, depression 7, together with the wall of the accommodation area of first housing part 12, delimits an annular spatial area in which adhesive may be introduced. Thus, the adhesive then ensures a rotatably-fixed connection between first housing part 12 and bushing 11.

In addition, bushing 11 has on its outer surface, thus, on the outer surface of outer sleeve section 22, a first axial part which is realized as insertion-fit area 1 and which facilitates the insertion of bushing 11 into the accommodation area, and an axial part adjacent to it which is effective as interference-fit area 2, so that a high static friction is obtained.

Preferably, the accommodation area of housing part 12 is additionally shrunk thermally onto the bushing. To that end, a temperature difference is provided between the bushing and housing part 12 during the joining process.

In the same way, the bushing also has an insertion-fit area and an interference-fit area which are effective upon joining with second housing part 14.

Bushing 11 has an inner sleeve section 21 and an outer sleeve section 22, inner sleeve section 21 accommodating the respective outer rings of bearings 8, 10, and outer sleeve section 22 contacting the accommodation areas of housing parts 12, 14.

In the radial clearance area between the two sleeve sections 21, 22, radially extending, spoke-like support ribs 4 are situated, so that an axial through-opening 3 is present between each two next-adjacent support ribs in the circumferential direction. In this way, oil is able to be passed through from the axially front to the axially rear side of bushing 11.

Support ribs 4, outer sleeve section 22 and inner sleeve section 21 are preferably realized in one piece.

Bushing 11 is preferably made of steel or a metal such as aluminum.

In a further exemplary embodiment of the present invention, instead of tapered roller bearings 8, 10 shown, disposed in O-configuration or tandem configuration, other bearings such as ball roller bearings are used.

LIST OF REFERENCE CHARACTERS

1. Insertion-fit area
2. Interference-fit area
3. Opening, through-hole for oil exchange
4. Support rib
5. Line of symmetry
6. Bearing housing
7. Depression to form a spatial area for adhesive bonding as a safeguard against twisting
8. Bearing 9. Bevel pinion
10. Bearing
11. Bushing
12. First housing part
13. Bevel-gear wheel
14. Second housing part
16. Gear wheel
17. Shaft, particularly input shaft, especially rotor of an electric motor
18. Intermediate shaft
19. Retaining ring
20. Gear wheel
21. Inner sleeve section
22. Outer sleeve section

What is claimed is:

1. A gear unit, comprising:
a housing including a first housing part and a second housing part;
a bushing; and
two bearings accommodated in the bushing and adapted to rotatably support a shaft in the housing;
wherein the bushing is at least partially interference-fit to the first housing part and at least partially slip-fit to the second housing part.

2. The gear unit according to claim 1, wherein the bushing centers the first housing part against the second housing part.

3. The gear unit according to claim 1, wherein the bushing is at least partially slip-fit to the first housing part and at least partially interference-fit to the second housing part.

4. The gear unit according to claim 1, wherein the bushing projects at least partially from the first housing part.

5. The gear unit according to claim 4, wherein a portion of the bushing that project from the first housing part is partially slip-fit to the second housing part and partially interference-fit to the second housing part.

6. The gear unit according to claim 1, wherein the bushing includes a first axial region arranged as a slip-fit region and a second axial region arranged as an interference-fit region.

7. The gear unit according to claim 6, wherein the slip-fit region is arranged at an axial end region of the bushing and the interference-fit region is located axially inward of the slip-fit region.

8. The gear unit according to claim 1, wherein the bushing has an outer sleeve section that abuts against accommodation areas of the first and second housing parts.

9. The gear unit according to claim 1, wherein the bushing has an inner sleeve section which accommodates a first bearing in a first axial part and a second bearing in a second axial part, wherein a crosspiece segment is disposed axially between the first and second axial parts whose smallest radial distance is less than a smallest radial distance of the first axial part or the second axial part.

10. The gear unit according to claim 8, wherein the bushing has an inner sleeve section which accommodates a first bearing in a first axial part and a second bearing in a second axial part, wherein a crosspiece segment is disposed axially between the first and second axial parts whose smallest radial distance is less than a smallest radial distance of the first axial part or the second axial part.

11. The gear unit according to claim 10, wherein the inner sleeve section and the outer sleeve section are joined via support ribs that are set apart from each other.

12. The gear unit according to claim 11, wherein the support ribs are evenly spaced from each other in a circumferential direction.

13. The gear unit according to claim 1, wherein the bearings are tapered roller bearings in an O-configuration, an X-configuration, and/or a tandem configuration.

14. The gear unit according to claim 1, wherein:
the intermediate shaft is joined in rotatably fixed manner to a first toothing part or has a corresponding toothing section, so that a first axial bearing is bounded axially by the toothing part or the toothing section; and
on an opposite axial side of the bushing, a further toothing part is joined in a rotatably fixed manner to the intermediate shaft and bounds the other bearing axially.

15. The gear unit according to claim 14, wherein the further toothing part is bounded axially by a retaining ring.

16. The gear unit according to claim 1, wherein the bushing is pressed into an accommodation area of the first housing part and into an accommodation area, situated coaxially relative to the accommodation area of the first part, of the second housing part.

17. The gear unit according to claim 1, wherein the first and second housing parts are imperviously joined.

18. The gear unit according to claim 16, wherein an annular spatial area adapted to receive adhesive is located between one of the housing parts and the bushing.

19. The gear unit according to claim 18, wherein the spatial area is delimited by a depression in the bushing and by an accommodation area of one of the first housing part and the second housing part for the bushing.

20. The gear unit according to claim 18, wherein an adhesive is provided in the annular spatial area and rotatably fixes the one of the housing parts and the bushing.

* * * * *